March 28, 1967 D. H. BROOKS 3,311,487
SPRAY COATING METHOD
Original Filed Oct. 20, 1959 2 Sheets-Sheet 1

INVENTOR.
DONALD H. BROOKS
BY
ATTORNEYS

INVENTOR.
DONALD H. BROOKS

3,311,487
SPRAY COATING METHOD
Donald Herbert Brooks, Vereeniging, Transvaal, Republic of South Africa, assignor, by mesne assignments, to International Protected Metals, Inc., a corporation of New Jersey
Continuation of application Ser. No. 847,643, Oct. 20, 1959. This application May 20, 1964, Ser. No. 377,158
1 Claim. (Cl. 117—21)

This application is a continuation of my copending application Serial No. 847,643, filed Oct. 20, 1959, now abandoned.

The present invention relates to a spray-coating method and means for carrying out the process. More particularly, the invention is applicable to those types of such processes in which a particulate material is sprayed onto an article and caused to adhere thereto to form a coating.

In known types of such spraying processes for applying plastic coatings, the article to be coated is either preheated and the resin sprayed thereon in powder form or alternatively the powder spray may be heated by a gas flame on emergence from the spray nozzle so that it is sufficiently plastic to adhere to the article on which it impinges.

A basic difficulty in this type of process is to maintain an even discharge of powder as the powder outlet valves tend to become clogged and, even where the powder is fed from a reservoir by entrainment in an airstream, packing of the powder tends to occur (even with vibration thereof), resulting in a variable discharge.

It is an object of this invention to provide means whereby a substantially uniform resin powder discharge may be maintained for spraying purposes.

Known apparatus and processes also suffer from the disadvantage that they do not allow of much adjustment of the feed rate of the powder. It is an object of the invention to overcome this difficulty.

Further objects, advantages and applications will become apparent from the following.

The process in accordance with the invention comprises producing an aerated bed of particulate coating material in an aerating vessel, the degree of aeration being below the limit at which a substantial part of the particulate material becomes entrained in the erating medium, with drawing at the desired rate a stream of aerated material from the aerating vessel by virtue of the pressure in the aerating vessel at the locality of withdrawal and feeding this stream to means serving for the forwarding and discharge of the particulate material onto the article to be coated.

The said means serving for the forwarding and discharge of the particulate material onto the article to be coated may comprise a booster fan or equivalent and a pipe connected thereto by which the stream of particulate material is picked up, mixed with a booster gas stream, if desired, preheated, and discharged as a spray at the far end of the said pipe. The booster gas may be an inert gas to counteract oxidation. A suitable nozzle may be used to produce the required type of spray, provision being preferably made for the adjustment of the angle of discharge.

The amount of aerated material issuing from the container may be controlled in various ways. For example, the size of the outlet aperture form the container may be varied; a variable speed fan may be used; the position of the outlet from the container may be varied in the height of the aerated zone or the pressure in the aerating vessel may be varied e.g. by fitting it with a restricted air outlet of adjustable size.

In a preferred form of the process in accordance with the present invention, the aerated material is withdrawn from an aerated bed and the material is transported in an aerated condition, motivated by the pressure in the aerated bed at the point of withdrawal, to a point of discharge at which the residual pressure is still adequate for a satisfactory spraying operation.

The process may be carried out with the particulate material in the aerating vessel in a truly fluidized condition. It has, however, been found particularly advantageous to maintain an overall average state in the aerating vessel intermediate between that normally referred to as fully and evenly fluidized and that in which the particles are fully settled. More particularly, a "static aerate" condition is maintained, a "static aerate" being defined as an aerated condition intermediate between the fluidized and the settled state, and in which the material exhibits a high degree of mobility when mechanically disturbed and yet has a certain angle of repose which is, however, lower than the angle of repose of the un-aerated powder, there being no or very little relative movement between adjoining particles as long as the bed is left undisturbed.

The various states of aeration referred to in this specification and particularly the "static aerate" are described in great detail in my pending patent application Ser. No. 350,911, filed Mar. 20, 1964, now Patent No. 3,196,033. The static aerate can be produced by initially fluidizing the particulate material completely and subsequently reducing the flow velocity to the desired degree. The static aerate may also be obtained direct by applying a slow gas stream to the powder while agitating it carefully in a suitable manner, e.g. mainly in a direction from the bottom of the vessel to the top.

The process is preferably carried out with a bed support producing an extremely fine gas dispersion, e.g. very tightly woven synthetic filter cloth. Conventional bed supports, however, may also be used. Wire gauze and felt usually give unsatisfactory results.

The pressure in the aerated bed may, for example, be at the point of withdrawal between 8 and 100 lbs./sq. inch above that of the atmosphere at the point of discharge. The aerated powder normally passes through a tube of small inner diameter from the point of withdrawal to the point of discharge. The tubes may, for example, have a bore between $1/32$ and $1/8$ inch, preferably of the order of $3/64$ of an inch, in the case of short tubes. When using longer tubes, say 30 feet long, it is preferred to use larger bores, say between $1/8$ and $1/2$ inch.

It is sometimes advantageous to provide a thin wire inside the tube by means of which blockages can be removed should they occur. Constrictions at the discharge end are preferably avoided. A spray of the desired shape and quality may be produced by the use of suitable deflecting means which are preferably outside the point of discharge or which are at least provided in such a manner that the cross-sectional area at the discharge end is not reduced as compared with the cross-sectional area of the tube. Various forms of deflectors occur to those skilled in the art.

In contrast with the aforegoing, it is advantageous if the aerated material passes through a constriction at the point of withdrawal from the aerated bed, prior to its entry into the tube.

In this type of spray process, the powder leaves the point of discharge in a very concentrated form and relatively undiluted by the aerating medium. No additional booster gas need be employed. The powder may actually be as much as 280 times more concentrated than is the usual practice.

Known processes use a very dilute powder jet with a high proportion of propellant gas. This may sometimes be a serious disadvantage, particularly when coating inaccessible corners, since the gas may tend to blow the particles off the article being coated before bonding has set in. The gas may also have a disadvantageous cooling effect. Energy is furthermore wasted in setting up such air or gas streams.

The process is usually carried out with powders of thermoplastic material, e.g. polyethylene, polyamides, polyvinyl resins or the like. In these cases the preferred particle size is between 40 and 200 mesh (British Standard), say between 40 and 100 mesh, the individual particles being preferably devoid of random projections.

When spraying thermoplastic powder onto a preheated article, it is advantageous to preheat the powder to a temperature below that at which it becomes tacky, either by heating the aerating vessel as such or by using a hot aerating medium. To avoid oxidation of the powder on heating, it is often advantageous to use an inert aerating medium, e.g. nitrogen, carbon dioxide, industrial waste gases having a low oxygen content and containing no components which react chemically with the powder. The use of an inert aerating medium will also help to counteract oxidation when applying the process in accordance with the invention to the flame-spraying type of operation.

Known flame-spraying methods have been known to produce unsatisfactory coatings due to excessive oxidation and/or decomposition of the plastic powder resulting from the flame.

The invention is not limited to the use of thermoplastic powders. It is, for example, possible to spray solid particles, e.g. glass beads, sand or the like onto a tacky surface to which they adhere on impact.

The spraying apparatus for carrying out the process in accordance with the invention comprises an aerating vessel having a discharge outlet below the normal upper level of the aerated bed in the vessel and means for picking up the particulate material streaming from the said outlet and for forwarding and discharging it onto the article to be coated.

The said means for forwarding and discharging the particulate material may comprise the booster fan or the like and other associated means as specified in the description of the method.

On the other hand, the apparatus may be adapted for the method in which the pressure of the aerated material serves to transport the material right onto the articles being coated. In this case the apparatus for carrying out the method comprises an aerating vessel adapted to be operated under pressure, e.g. by having a constricted gas outlet above the normal level of the aerated bed in the aerating vessel and further comprises a withdrawl outlet in the aerating zone directly connected or adapted to be connected to an opening for the discharge of the powder onto the object to be sprayed. The constricted gas outlet is preferably provided with means by which the degree of constriction can be adjusted so as to adjust the pressure in the aerated bed.

Also in this case, it is advantageous to provide means for adjusting the size of the withdrawal outlet so as to regulate the amount of particulate material streaming from the aerating vessel.

Normally the apparatus also comprises a conduit, e.g., a tube of rubber or plastic material having the dimensions as specified above, connected or adapted to be connected between the said point of withdrawal from the aerated bed to the point of discharge. At the point of discharge of the apparatus, a suitable nozzle device may be provided, e.g. comprising one or more deflectors which are preferably adjustable or exchangeable to produce various forms and qualities of spray. The discharge end of the apparatus is preferably so constructed that there is no constriction as compared with the inner diameter of the tube or the like.

A loose thin wire may be provided inside the tube. A constriction is preferably provided between the point of withdrawal from the aerated bed and the tube leading to the point of discharge. The aerated powder passes through the thin tube with ease. In the rare event of a blockage occurring the difficulty can be overcome by a slight movement of the wire inside the tube.

In the various modifications of the apparatus as specified above, it is often advantageous to employ more than one aerating vessel, means being provided for adjusting the feeding rate of aerated material from the different aerating vessels to a single set of forwarding and discharge means. Normally the two or more aerating vessels contain different particulate materials, e.g. a strongly bonding material in one vessel and an outer coating material in the other. It is then possible to switch over from one powder to the other whenever desired, or to feed several different powders simultaneously in desired proportions.

Of course, it is also possible to provide more than one point of withdrawal or to connect more than one spray nozzle to a single aerating vessel.

The preheating of articles to be coated with thermoplastic resins preferably takes place by a method which comprises locating the article under a canopy closed at the top and sides, blowing hot gas into the canopy or heating the gas under the canopy and thereafter raising the canopy relative to the article to allow access to the article for further processing.

The canopy may be counterweighted to facilitate this operation.

As an example of this feature of the invention as applied to the coating of small articles there is provided a table over which is fitted a canopy which is conveniently in the form of a rectangular box open only at the bottom and built up of polished aluminium sheets. The canopy is suspended from a chain or cable passing over a pulley and connected to a hand or foot lever whereby the canopy may be raised clear of the table.

On the table there is provided a gas burner which when lighted discharges into the canopy through the open bottom thereof, the canopy either having a cut-away portion for this purpose or being located a small distance above the table. This also allows for the discharge of the gases from underneath the canopy.

To apply the plastic coating to articles, they are placed in turn or in groups under the canopy and when sufficiently preheated, removed after raising the canopy. The main advantages gained by the use of this method are the ease of handling the articles and the economising on fuel since very little hot gas is lost from the canopy when it is raised and lowered as compared with the very much greater loss in opening and closing an oven door, and the better maintenance of an inert atmosphere.

It will be obvious that instead of raising and lowering the canopy the same relative movement may be obtained by raising and lowering the table under a fixed canopy.

This method is particularly suitable for the coating of large articles which cannot easily be moved. In this case a suitably suspended light aluminium canopy is erected over the article and into which gas flames are directed. The canopy is raised to enable the article to be sprayed, and then lowered periodically to maintain the article within the required temperature limits for spraying.

Since the waste gases tend to flow around the bottom edge of the canopy and thence in an upward direction, a second canopy may be fitted to form a jacket around the first canopy. The bottom of the jacket may extend below the bottom of the canopy and the top of the jacket may be fitted with an outlet vent. This arrangement will provide a heated insulating covering for the canopy and thus assist in conserving fuel, while removing unpleasant fumes.

I have found that the temperature in the canopy is substantially even and the interior thereof may be brought very quickly up to the normally required temperatures. A fan may be installed if desired.

These canopies can be constructed at a small fraction of the cost of conventional heating ovens as employed in conventional plastic coating plants. The canopies may also be composed of standardized panels or sections from which canopies of the required size may be assembled.

The above-mentioned preheating method has been employed in the various examples described further below.

The invention and the manner in which it may be put into practice will be further described by way of example with reference to the accompanying drawings.

EXAMPLE 1

Operation with booster fans

Figure 1:
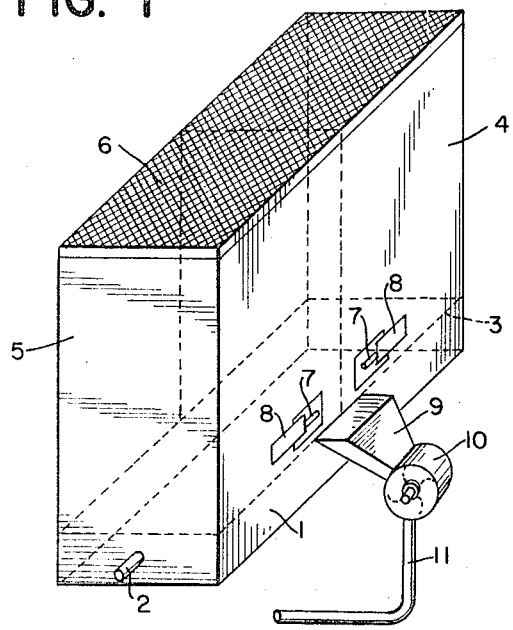
FIG. 1 represents a perspective view, somewhat diagrammatic, of an embodiment of the apparatus in accordance with the invention.

Referring to FIG. 1 the apparatus comprises a gas box 1 with a gas inlet 2. Above the gas box, and separated therefrom by a filter 3, two aerating vessels 4 and 5 are provided. The tops of the aerating vessels are closed off by a filter cloth lid 6. The filter cloth 6 serves to prevent the escape of entrained powder and simultaneously causes a back pressure to be built up in the aerating vessels. The aerating vessels are each provided with a slot 7, just above the filter 3. These slots may be opened or closed to the desired degree by means of slide valves 8. In this manner, it is possible to regulate the rate at which the aerated powder streams from the aerating vessels into the funnel 9 of the booster fan 10. The outlet of the booster fan is connected to a flexible hose 11, the far ends of which may be connected to a suitable nozzle adaptor, two examples of which are shown in FIGS. 3 and 4 respectively.

Figure 3:
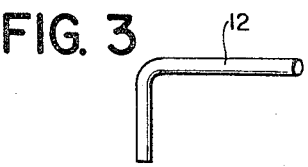
FIGS. 3 and 4 represent alternative nozzle adaptors.
Figure 5:
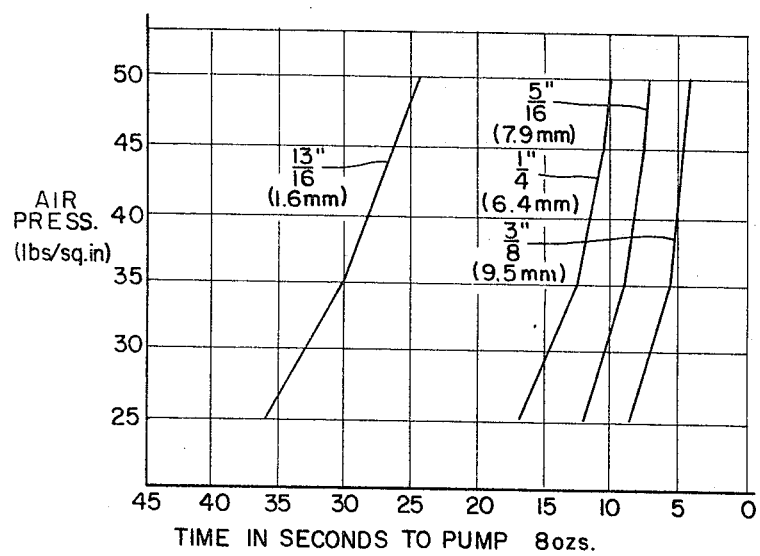
FIG. 5 represents a graphical representation of the power feed rate through tubes of various diameters when using different pressures.
Figure 4:
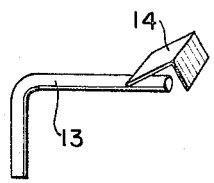
Figure 6:
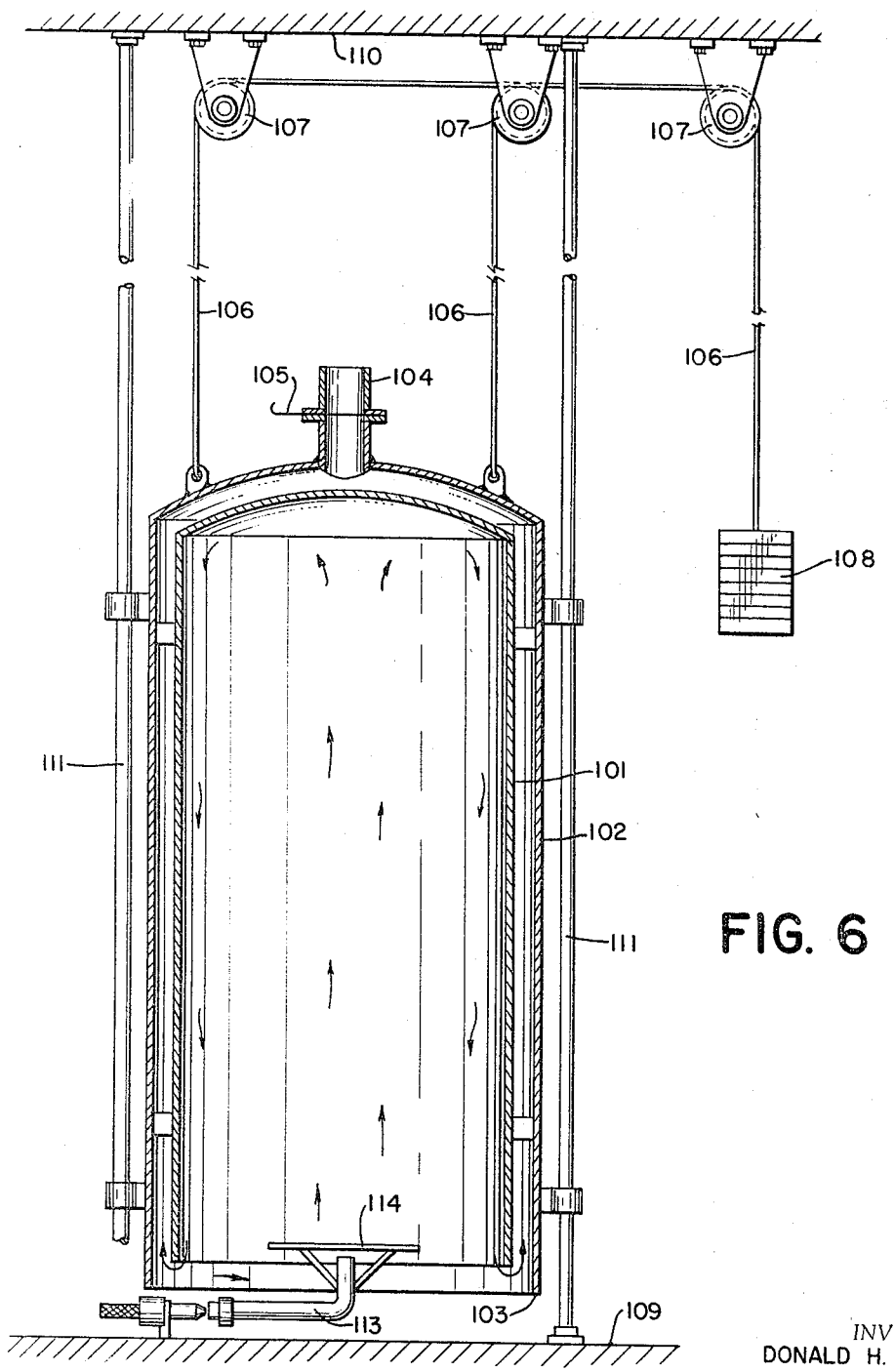
FIG. 6 represents a cross-sectional view of an embodiment of the invention.

The nozzle adaptor 12 of FIG. 3 produces an undeflected conical spray, whereas the nozzle adaptor 13 shown in FIG. 4 is provided with an angle deflector plate 14 which results in a fan-shaped spray.

In practical operation, the vessel 4 may be charged with a powder particularly suitable for prime coatings and vessel 5 with the powders used for the final coatings. Air or other gas under pressure is passed into the gas box 1 through inlet 2. The gas passes in a finely dispersed state through the filter 3 which causes the powders in vessels 4 and 5 to be aerated to the desired degree. Depending on the flow properties of the powder, the powder may be used either fully fluidized or in the static aerate condition specified above.

In the meantime, the article to be coated has been heated to a temperature at which the plastic powder will readily fuse without decomposing or oxidizing excessively. In the case of polyethylene powders being used, the temperature is normally of the order of 180–200° C.

The booster fan is then switched on and the slide valve 8 of vessel 4 opened to the desired degree. The spray discharged by nozzle 12 or 13 is directed onto the article being coated, preferably approximately normal to the surface being coated. A part of the powder adheres to the heated article and forms a coating. After a prime coating of the desired thickness has been built up, the valve 8 of vessel 4 is closed and the corresponding valve of vessel 5 is opened and the spraying is repeated to build up a final coating of the desired thickness and quality. The attachment 12 or 13 may also be replaced by a flame spraying attachment. In this case, great care has to be taken to avoid undue oxidation and decomposition of the plastic powder. This difficulty is largely overcome when feeding nitrogen or carbon dioxide gas into the funnel of the blower. This mode of operation is particularly economical wherever industrial waste gases are available which are inert to the plastic powder under the prevailing temperature conditions.

EXAMPLE 2

Preheating of spray

The same apparatus may be used as in Example 1. Flue gas having a temperature of approximately 85° C. is passed into the airbox whereby the polyethylene powder in the aerating vessel is preheated. The powder is then sprayed onto the preheated article in the manner described in the previous example and a noticeably improved adherence of the powder to the surface being coated is observed.

If, in addition, hot flue gas at 85° C. is passed into the funnel of the blower, the proportion of the powder adhering to the workpiece is approximately doubled.

EXAMPLE 3

Operation with pressurized aerating vessel

Figure 2:
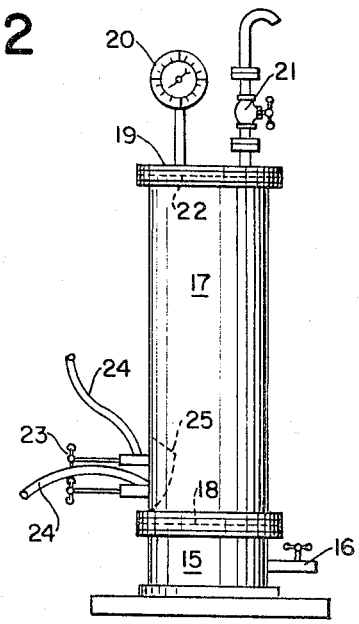
FIG. 2 represents a side elevation of an apparatus in accordance with the invention adapted to be operated under pressure.

Referring now to FIG. 2, the apparatus is designed to withstand pressures of at least 100 lbs./sq. inch. Again, the apparatus comprises a gas box 15 with a valve controlled inlet 16, an aerating vessel 17, above the gas box and separated therefrom by a filter 18 comprising a very tightly woven synthetic filter cloth. The aerating vessel is closed with a lid 19 to which a pressure gauge 20 is fitted and a release valve 21 which can be set to maintain the desired pressure in the aerating vessel. A filter cloth 22 is inserted between the aerating vessel and the lid 19 to prevent any possibility of powder entering the gauge 20 or the valve 21. Two outlet valves 23 are provided at the lower end of the aerating vessel serving to regulate the supply of aerated particulate material through flexible pipes 24. The ends of the flexible pipes 24 may again be fitted with nozzle attachments as shown in FIGS. 3 or 4. In this type of operation it is, however, advantageous to have no constriction whatsoever at the outlet end of the pipe. A baffle 25 is provided inside the aerating vessel to screen the outlet valves 23 and to prevent the preferential flow of aerating gas through the valves.

With this apparatus, I succeeded in producing a three foot long spray at the discharge end of a 3 foot long tube of ⁹⁄₆₄ inch internal diameter using a pressure inside the aerated bed of approximately 20 lbs./sq. inch above atmospheric pressure. By varying the pressure and/or the constriction between the point of withdrawal and the tube, I managed to vary the throughput of plastic powder between 5 lbs./ hour and 100 lbs./hour without any difficulty. 50 lbs./hour throughput were obtained with a fluidized bed having a pressure of 25 lbs./sq. inch. The powder used was a polyethylene powder having a particle size between 50 and 300 mesh (British Standard).

These results were obtainable with the powder in the aerating vessel 17 in a truly fluidized state. Blockage of the tube 24 hardly ever occurred and, in all cases, such blockages were easily eliminated by slightly moving a thin wire provided inside the tube 24.

The apparatus functioned most satisfactorily when operated under a static aerate condition. The advantages gained were a substantially decreased consumption of aerating medium, a virtually complete elimination of blockages allowing the wire inside the tubes 24 to be dispensed with and an even more concentrated and regular stream of plastic powder through the tube 24. In the case of polyethylene powder, the most favourable particle size was in the range of 40–100 mesh (British Standard).

When working with a short length of tubing 24, it is advantageous to employ very small inner diameters to obtain a fast flow rate through the flexible hose. If the tubes are longer, it is better to employ tubes having larger inner diameters, say between ⅛ and ½ inch. Preheating of the aerating medium and/or the aerating vessel itself may again be employed with advantage also in this type of operation.

EXAMPLE 4

*Flow rates obtainable with tubes of different diameters*

30 foot lengths of tubing of various diameter were connected to the valves 23 of the apparatus described in the previous example. The apparatus was charged with a high density polyethylene powder having a particle size between 40–100 mesh (British Standard). The time in seconds was measured to transport 8 ounces of plastic powder through the tubing using various air pressures. The results are plotted in FIG. 5.

Although pressures between 8 and 100 lbs./sq. inch were found adequate, there is no serious reason why higher pressures shoud not be used except for the fact that higher pressures will result in greater dilution of the powder with aerating medium in the resulting spray.

Referring to FIG. 6, the canopy 101 is surrounded by a jacket 102 open at the bottom edge 103 and provided with a gas outlet flue 104 at the top, which latter comprises a control damper 105. The whole arrangement is suspended from cables 106 passing over pulleys 107 and provided with counterbalance weights 108, and by means of which the canopy may be lowered to a position just above the floor 109 or raised to just below the ceiling 110 of the factory hall. Guide rods 111 serve to guide the movement of the canopy.

For setting up a hot and substantially inert atmosphere underneath the canopy, a burner 113 with baffle 114 is provided.

It will be seen that the lower edge 103 of the jacket 102 is slightly lower than the lower edge of the inner canopy 101, and accordingly the hot gases follow the approximate path indicated by the arrows.

In use, suitable stands are normally provided underneath the canopy from which the articles being heated may be suspended. Obviously the shape and size of the apparatus may be modified in accordance with any specific requirements.

What is claimed is:

A method of applying a permanent coating of a fusible plastic to an article, which comprises providing a bed of fusible particulate plastic material within an enclosure, said particles being thermoplastic resin having a particle size between 40 and 200 mesh (British Standard), aerating said bed to a state of dense phase aeration below the limit at which a substantial part of the particulate material becomes entrained in the aerating medium, said condition of dense phase aeration being a state of aeration intermediate between the fluidized and settled state, maintaining said aerated bed under superatmospheric pressure below its upper free surface, withdrawing a stream of said material in dense phase aerated condition from below the free surface of said bed solely by the super-atmospheric pressure condition of said aerated bed and conducting said stream to a discharge point, controlling the rate of withdrawal of said material from the discharge point by varying the amount of pressure in said bed above the pressure at the discharge point, heating the article to be coated to at least the fusion temperature of said material, directing said stream on to the surface of said heated article to cause the particles thereof to adhere thereto, and building up a coating of said material to a desired thickness.

References Cited by the Examiner

UNITED STATES PATENTS

| | | | |
|---|---|---|---|
| 1,585,990 | 5/1926 | Houghton | 118—308 |
| 2,336,946 | 12/1943 | Marden et al. | 117—18 |
| 2,571,608 | 10/1951 | Plagge | 117—17 |
| 2,708,622 | 5/1955 | Stone | 51—293 |
| 2,758,564 | 8/1956 | Randall | 118—309 |
| 2,817,310 | 12/1957 | Ponzini | 118—309 |
| 2,919,159 | 12/1959 | Lacroix | 302—53 |
| 2,924,489 | 2/1960 | Beckmann | 302—53 |
| 2,987,413 | 6/1961 | Dettling et al. | 118—429 |
| 3,032,816 | 5/1962 | Zimmerli | 117—21 X |

FOREIGN PATENTS

| | | |
|---|---|---|
| 773,375 | 4/1957 | Great Britain. |

OTHER REFERENCES

Kunststoffe Bd. 47, Heft 8, 1957, pp. 510, 511, 512.

Product Engineering, vol. 28, No. 1, January 1957, pp. 140–143.

WILLIAM D. MARTIN, *Primary Examiner.*

MURRAY KATZ, *Examiner.*

G. L. HUBBARD, P. ATTAGUILE, *Assistant Examiners.*